United States Patent [19]
Solbrig et al.

[11] 3,746,504
[45] July 17, 1973

[54] RADIANT GAS BURNER DEVICE FOR HEATING

[75] Inventors: Charles W. Solbrig, Idaho Falls, Idaho; Sanford A. Weil, Chicago; Robert B. Rosenberg, Evergreen Park, both of Ill.

[73] Assignee: American Gas Association, Inc., Arlington, Va.

[22] Filed: Oct. 19, 1970

[21] Appl. No.: 82,109

[52] U.S. Cl. ............... 432/31, 34/4, 431/329, 126/92
[51] Int. Cl. ............................................. F26b 3/28
[58] Field of Search ..................... 263/2, 52; 34/4

[56] References Cited
UNITED STATES PATENTS
3,237,314  3/1966  Smith, Jr. ........................... 34/4

*Primary Examiner*—John J. Camby
*Attorney*—Molinare, Allegretti, Newitt & Witcoff

[57] ABSTRACT

A high efficiency radiant heating device for heating radiant heat absorbers, and method of constructing high efficiency radiant heating devices. The device has an element which upon heating emits radiant energy. The radiation emitting element is selected to have high emissivity at wavelengths closely corresponding to those determined to be absorbable by the absorber.

15 Claims, 2 Drawing Figures

PATENTED JUL 17 1973 3,746,504

RADIANT GAS BURNER DEVICE FOR HEATING

BACKGROUND OF THE INVENTION

This invention relates to a method for making radiant heating devices and, more particularly, to a method for making a high efficiency radiant heating device.

There has been a large increase in the use of radiant heating devices as a means for providing heat energy. Examples of the use of radiant heat range from domestic cooking and patio heating to industrial processes such as paper drying or glass forming. In a survey of twenty manufacturers of infrared equipment to obtain their estimates of the potentiality of radiant heating devices, it was found that the average prediction was that about one-third of the total heating market will be eventually captured by radiant heating.

The increasing use of radiant heating devices, both the electric type and the gas or fuel burning type, can be traced to the advantages of radiant heating for particular applications. These advantages include the simplicity of generating infrared energy; the high rate of energy transfer which is possible with infrared energy; and the selective absorption of infrared energy by solids. The high rate of energy transfer is particularly important in industrial operations where higher production rates can be achieved because a product can be heated more rapidly. The selective absorption of infrared energy by various materials is advantageous in such applications as comfort heating in large open spaces such as warehouses and patios. Since infrared energy is primarily absorbed by solids and not by gases, people can be heated without heating all of the surrounding air. The use of radiant heat in industrial processes can result in large economy of costs by eliminating the heating of large volumes of hot air.

The available radiant heating devices, both the fuel burning type and the electrical resistance type, are manufactured to optimize the rated efficiency of the heating device. The rated efficiency of a heating device may be defined as the amount of heat radiated by the heater divided by the amount of heat supplied to the burner, multiplied by 100. Such a rated efficiency shows the fraction of the heating value of the fuel, or of the electrical energy supplied to the heater, which is emitted or radiated. Heretofore, it has been assumed that the most efficient radiant heating devices are those having a high rated efficiency. Unexpectedly, we have found that the most efficient radiant heaters are not necessarily those having a high rated efficiency. We have also found that the most efficient radiant heating devices for a particular heating operation is one which takes into account a number of factors, including the nature of the material to be heated, as to be described below.

It is, accordingly, an object of the present invention to provide a novel radiant heating device.

Another object of the invention is to provide a method for determining the efficient construction of radiant heating device for a particular application.

It is another object of the present invention to provide a radiant heater which is more efficient than those available heretofore.

It is a further object of the invention to provide an efficient method for providing radiant energy to a material to be heated.

It is another object of this invention to provide a radiant heater which heats materials more rapidly than heaters heretofore available with no increase in energy input rate.

Other objects of the invention will be evident from a reading of the description of the invention below.

SUMMARY OF THE INVENTION

Figure 1:
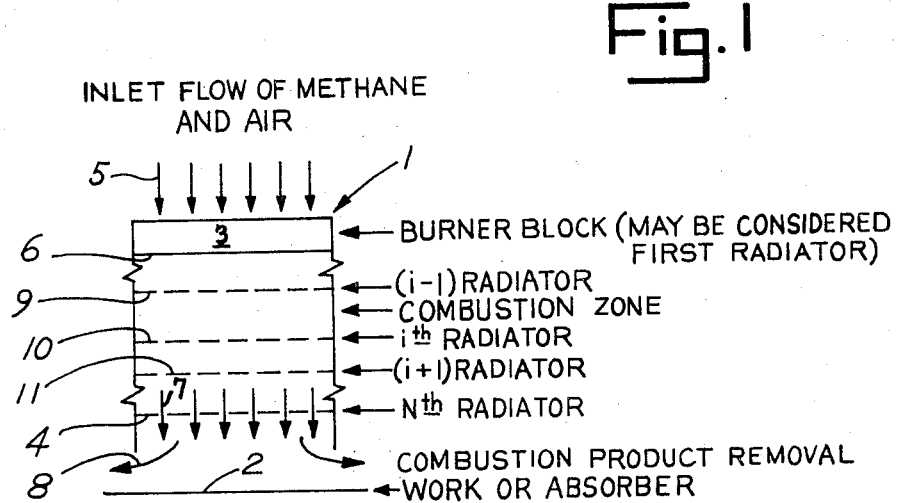
FIG. 1 shows schematically a gas-fired radiant burner in accord with one embodiment of the invention.

In accordance with the present invention, we provide a method for determining the most efficient construction of a radiant heating device for a particular heating operation by finding the most suitable material for making the radiant elements in the radiant heating device. As to be explained below, the present invention provides a method for selecting the material of construction of the radiant element in a radiant heating device to maximize the fraction of the heating value of fuel or electrical energy supplied to the radiant heating device which is ultimately absorbed by the work to be heated. This is accomplished by taking into consideration the emissivity of the radiant element, the nature of the radiation emitted by the radiant element, and the absorptivity of the work to be heated with respect to the radiation emitted by the particular radiating element.

Briefly, the invention provides a method for constructing a high efficiency radiant heating device to heat an absorber of radiant energy having particular wavelengths which comprises: finding materials which upon heating emit radiant energy having wavelengths closely corresponding to that absorbable by the absorber; selecting a material having a high emissivity from said materials; and making the radiation emitting element in the heating device from the selected material.

The present invention is based on the principle that the most efficient radiant heating devices are those which cause the maximum amount of the heat energy supplied to the heating devices to be absorbed by the work to be heated. Such an efficiency may be defined as the overall efficiency of a radiant heating device. As indicated above, in the prior art, radiant heating devices have been designed to optimize the rated efficiencies. However, the rated efficiency of a heating device only takes into account the emissive power of the heating or radiating element and it does not take into consideration whether or not the radiation emitted is of the type absorbable by the work to be heated. In accordance with the present invention, a method for manufacturing a radiant heating device is provided wherein the radiating element is constructed from a material which emits a large amount of radiation within the wavelength region absorbable by the work.

The present invention is not particularly concerned with the geometry of construction of the radiant heaters. A prior art effort dealing with the problem of optimum geometry of construction for a gas-fired radiant heater are shown, for example, by Schwank U.S. Pat. No. 2,775,294 and Swinderen U.S. Pat. No. 3,107,720. For the purposes of describing the present invention, it will be assumed that the optimum geometry and design is employed for the radiant device so that a minimum loss of heat to the surroundings by convection or conduction is realized. The present invention is primarily concerned with selection of the material of construction for the radiating element within the radiant heating device so that a maximum fraction of the heat supplied to the radiant heating device is ultimately absorbed by the work.

As indicated above, the fraction of the heat energy supplied to the radiant heating device that is absorbable by the work may be defined as the overall efficiency of the radiant heating device. This overall efficiency may be though of as the product of the rated efficiency of the heating device multiplied by a coupling efficiency between the heating device and the work to be heated. The rated efficiency of the heating device is generally a functioning of the emissivity of the radiating element within the heating device and the rate at which the heat energy is being supplied to the heating device. The coupling efficiency is dependent not only on the nature of the radiating element but also on the absorptivity of the work with respect to the particular radiation being emitted by the radiating element. These items are more clearly illustrated by the following equations:

$\eta_r$ = rated efficiency =

$$\frac{\text{Radiant heat emitted by the heater}}{\text{Total heat or energy supplied to the heater}} \times 100\%$$

$\eta_c$ = coupling efficiency =

$$\frac{\text{Radiant heat absorbed by the work}}{\text{Radiant heat emitted by the heater}} \times 100\%$$

$\eta_o$ = overall efficiency = $\eta_r \times \eta_c$ =

$$\frac{\text{Radiant heat absorbed by the work}}{\text{Total heat supplied to the heater}} \times 100\%$$

BRIEF DESCRIPTION OF THE PREFERRED EMBODIMENTS

In the following discussion, particular reference will be made to a gas-fired radiant heating device although it is to be understood that the present invention is also applicable to electric powered radiant heating device with appropriate modification. In a fuel burning radiant heater, it is usual to provide a source of a fuel such as natural gas, a supply of an oxidant such as air, and a mixing chamber. See, e.g. the Swinderen U.S. Pat. No. 3,107,720. The fuel and air mixture is usually burned near a grid or screen which forms the radiating element for emitting the desired radiant heat energy. When the hot gases pass throught the grid or screen, heat transfer takes place and the radiating element is heated to a temperature near that of the exhaust flue gases. For the purposes of the present discussion, it will be assumed that the temperature of the radiating element is equal to the temperature of the exhaust gases, which is equivalent to assuming that the heat transfer coefficient between the gases and the radiating element is so large as to be equal to infinity for practical purposes. We have found that such an assumption can be closely approximated by constructing the radiating element with a large heat transfer surface area, for example, by making the radiating element from a plurality of screen-like layers which form an opaque radiator but permit the hot gases to pass therethrough.

The overall efficiency, rated efficiency and coupling efficiency of various radiating materials when used to heat various absorbers can be calculated from available data, to be indicated below. Alternatively, these efficiencies can be determined experimentally. Both of these approaches are explained below.

We have found that the rated efficiency and the coupling efficiency of a radiating element and a particular work can be approximately expressed by the following equations:

$$\eta_r = \frac{\int_0^\infty \epsilon(\lambda) E_{bb}(\lambda, T) d\lambda}{\dot{m}\Delta H}$$

$$\eta_c = \frac{\int_0^\infty \alpha(\lambda)\epsilon(\lambda) E_{bb}(\lambda, T) d\lambda}{\int_0^\infty \epsilon(\lambda) E_{bb}(\lambda, T) d\lambda}$$

$$\eta_o = \frac{\int_0^\infty \alpha(\lambda)\epsilon(\lambda) E_{bb}(\lambda, T) d\lambda}{\dot{m}\Delta H}$$

$$\epsilon(\lambda) = A_1 + \sum_{n=1}^{m} A_i e^{-\left(\frac{\lambda - \lambda_i}{b_i}\right)}$$

$$E_{bb}(\lambda, T) = \frac{C_1}{\lambda^5 \left(e^{\frac{C_2}{\lambda T}} - 1\right)}$$

$C_1 = 1.187 \times 10^8$ B.t.u. $\mu^4/\text{ft.}^2$ hr.
$C_2 = 25,896 \ \mu^\circ R$ where $\epsilon$ is the emissivity of the radiating element; $\lambda$ represents wavelength; $E_{bb}$ is the emissive power of a black body; $T$ is the temperature of the radiating element; $\dot{M}$ is moles of fuel supplied to heating device; $\Delta H$ is the heat of combustion per mole of fuel; and the remaining characters are various constants. The absorptivity of the work to be heated, $\alpha$, also expressed above as a function of $\lambda$, can be represented by an equation similar in form to that for the emissivity of the radiating element as shown above with different constants.

The constants in the above equations can be determined for any particular material by fitting the equations to known data for emissivity and absorptivity for that material. Once the constants are determined for a particular radiating material and a particular work to be heated, the overall efficiency for using that radiating material to radiantly heat the work can be calculated at various rates of supply of heat to the radiant heating device.

A common heating operation is one involving the evaporation of a thin film of water from a substrate. In such an operation, the overall efficiency is the amount of radiant heat energy absorbed by the thin film of water divided by the amount of heat energy supplied to the radiant heating device. Since the evaporation of a thin film of water is a common industrial occurrence, the rated efficiencies, coupling efficiencies and overall efficiencies of various material as the radiating element in a radiant heater for such an operation has been calculated at various rates of energy input to the heater. In these calculations, it was assumed that the radiating element would be present in the form of a screen having about 80 percent solid area mounted in a fuel burning device, with arrangements for the hot flue gases to flow through the foraminous radiating element. The results of such calculations are tabulated below.

All of the areas mentioned refer to the solid or effective radiating area of the burner rather than the total area. For example, a burner of the type shown in U.S. Pat. No. 2,775,294 may have a range of about 67–80 percent solid area, and the values herein referring to square feet, or square foot of radiating element surface area refers to the 67–80 percent, not the gross size.

In addition, the coupling efficiencies of two absorbers other than a thin film of water has been calculated and these are also tabulated below. The "substance 1" absorber shown in Table 6 is a hypothetical substance having an absorptivity equal to 1.0 for radiant energy having wavelengths between 0 and 2 microns but an absorptivity of zero for radiant energy having wavelengths greater than 2 microns. Various metals have approximately this absorptivity characteristic. Hypothetical "substance 2," shown in Table 7, is an absorber having an absorptivity of 1.0 for radiant energy having wavelengths greater than 2.0 microns but having an absorptivity of zero for radiant energy having shorter wavelengths. Various materials such as vegetables, oxides of metals, etc., have approximately this characteristic.

In computing these tables, the properties of pure methane has been used as the fuel. Methane has a heat of combustion of about 83 BTU/SCF of stoichiometric methane and air. When interpolating in these tables for natural gas combustion, the actual heat input should be used for interpolation (natural gas has a heat of combustion of approximately 100 BTU/SCF of fuel and air mixture).

Table 1. RATED EFFICIENCIES OF FLOW-THROUGH RADIATORS, ASSUMING MAXIMUM HEAT TRANSFER COEFFICIENT

| Radiating Material | Velocity, SCF/hr-sq ft | | | |
|---|---|---|---|---|
| | 250 % | 500 % | 1000 % | 2000 % |
| Blackbody | 79.57 | 63.33 | 55.17 | 46.23 |
| Beryllium | 53.27 | 46.00 | 38.23 | 30.21 |
| Carbon | 63.88 | 56.21 | 47.58 | 38.85 |
| Chromium | 56.98 | 48.86 | 40.13 | 31.15 |
| Iron | 50.15 | 42.00 | 33.51 | 25.05 |
| Molybdenum | 47.61 | 40.00 | 31.75 | 28.79 |
| Nickel | 49.54 | 41.35 | 32.86 | 24.40 |
| Palladium | 46.90 | 38.69 | 30.24 | 22.04 |
| Platinum | 45.82 | 37.58 | 29.20 | 21.11 |
| Rhodium | 41.22 | 32.52 | 24.03 | 16.35 |
| Silicon | 66.80 | 59.20 | 50.72 | 41.58 |
| Tantalum | 48.77 | 40.20 | 31.46 | 23.00 |
| Tungsten | 49.35 | 41.30 | 33.00 | 24.72 |
| Nickel Aluminate | 67.55 | 59.86 | 51.27 | 42.05 |
| Silicon Carbide | 70.19 | 62.89 | 54.68 | 45.67 |
| Tantalum Carbide | 55.83 | 47.36 | 38.40 | 29.34 |
| Aluminum Nitride | 68.56 | 60.88 | 52.28 | 43.04 |
| Boron Nitride | 67.34 | 58.56 | 48.50 | 37.71 |
| Aluminum Oxide | 56.09 | 44.49 | 32.84 | 22.22 |
| Beryllium Oxide | 66.12 | 57.01 | 46.82 | 36.22 |
| Cerium Oxide | 54.51 | 44.68 | 34.62 | 24.95 |
| Chromium Oxide | 69.74 | 62.33 | 53.95 | 44.81 |
| Manganese Oxide | 63.29 | 54.61 | 45.04 | 35.05 |
| Neodymium Oxide | 55.60 | 44.83 | 33.72 | 23.31 |
| Nickel Oxide | 67.71 | 60.07 | 51.54 | 42.40 |
| Silicon Oxide | 65.76 | 56.07 | 44.89 | 33.06 |
| Thorium Oxide | 50.90 | 40.01 | 29.42 | 19.88 |
| Zinc Oxide | 66.76 | 57.44 | 46.72 | 35.32 |
| Zirconium Oxide | 58.87 | 48.51 | 37.80 | 27.44 |
| Mantle Fabric | 37.41 | 25.49 | 15.86 | 9.12 |
| Oxidized Inconel | 67.11 | 59.51 | 51.08 | 42.09 |
| $Al_2O_3$ with Mo Coating | 51.53 | 45.15 | 38.23 | 30.90 |
| Water Film "Fingerprint" | 61.61 | 51.75 | 40.62 | 29.11 |
| Vanadium | 48.61 | 40.71 | 32.53 | 24.42 |

Table 2. RATED OUTPUTS ($10^4$ Btu/hr.-sq ft) OF FLOW-THROUGH RADIATORS, ASSUMING MAXIMUM HEAT TRANSFER COEFFICIENT

| Radiating Material | Velocity, SCF/hr-sq.ft | | | |
|---|---|---|---|---|
| | 250 | 500 | 1000 | 2000 |
| Blackbody | 1.467 | 2.632 | 4.587 | 7.687 |
| Beryllium | 1.107 | 1.912 | 3.197 | 5.024 |
| Carbon | 1.328 | 2.336 | 3.973 | 6.460 |
| Chromium | 1.184 | 2.031 | 3.336 | 5.180 |
| Iron | 1.042 | 1.746 | 3.786 | 4.165 |
| Molybdenum | 0.9896 | 1.654 | 2.640 | 3.956 |
| Nickel | 1.030 | 1.719 | 2.732 | 4.064 |
| Palladium | 0.9748 | 1.608 | 2.514 | 3.664 |
| Platinum | 0.9523 | 1.562 | 2.428 | 3.510 |
| Rhodium | 0.8569 | 1.352 | 2.000 | 2.719 |
| Silicon | 1.388 | 2.461 | 4.217 | 6.914 |
| Tantalum | 1.014 | 1.671 | 2.616 | 3.825 |
| Tungsten | 1.026 | 1.717 | 2.742 | 4.111 |
| Vanadium | 1.010 | 1.692 | 2.705 | 4.060 |
| Nickel Aluminate | 1.404 | 2.488 | 4.263 | 6.992 |
| Silicon Carbide | 1.459 | 2.614 | 4.546 | 7.595 |
| Tantalum Carbide | 1.160 | 1.969 | 3.193 | 4.879 |
| Aluminum Nitride | 1.425 | 2.531 | 4.347 | 7.157 |
| Boron Nitride | 1.400 | 2.434 | 4.033 | 6.272 |
| Aluminum Oxide | 1.168 | 1.850 | 2.730 | 3.696 |
| Beryllium Oxide | 1.374 | 2.370 | 3.892 | 6.024 |
| Cerium Oxide | 1.133 | 1.857 | 2.878 | 4.149 |
| Chromium Oxide | 1.450 | 2.591 | 4.485 | 7.452 |
| Manganese Oxide | 1.315 | 2.270 | 3.744 | 5.829 |
| Neodymium Oxide | 1.156 | 1.864 | 2.803 | 3.876 |
| Nickel Oxide | 1.408 | 2.497 | 4.285 | 7.050 |
| Silicon Oxide | 1.367 | 2.331 | 3.732 | 5.500 |
| Thorium Oxide | 1.058 | 1.664 | 2.446 | 3.306 |
| Zinc Oxide | 1.388 | 2.388 | 3.885 | 5.874 |
| Zirconium Oxide | 1.224 | 2.017 | 3.143 | 4.564 |
| Mantle Fabric | 0.777 | 1.060 | 1.319 | 1.517 |
| Oxidized Inconel | 1.395 | 2.474 | 4.247 | 7.000 |
| $Al_2O_3$ with Mo Coating | 1.071 | 1.877 | 3.179 | 5.139 |
| Water Film "Fingerprint" | 1.291 | 2.151 | 3.377 | 4.841 |

Table 3. RATED TEMPERATURES OF RADIATING ELEMENTS IN FLOW-THROUGH RADIATORS, ASSUMING MAXIMUM HEAT TRANSFER COEFFICIENT

| Radiating Material | Velocity, SCF/hr-sq ft | | | |
|---|---|---|---|---|
| | 250 °R | 500 °R | 1000 °R | 2000 °R |
| Blackbody | 1728 | 1994 | 2286 | 2597 |
| Beryllium | 2352 | 2607 | 2869 | 3133 |
| Carbon | 1974 | 2249 | 2543 | 2848 |
| Chromium | 2222 | 2507 | 2805 | 3103 |
| Iron | 2462 | 2742 | 3026 | 3298 |
| Molybdenum | 2550 | 2817 | 3084 | 3337 |
| Nickel | 2483 | 2764 | 3048 | 3316 |
| Palladium | 2574 | 2854 | 3133 | 3390 |
| Platinum | 2612 | 2892 | 3163 | 3418 |
| Rhodium | 2769 | 3059 | 3329 | 3557 |
| Silicon | 1867 | 2143 | 2442 | 2756 |
| Tantalum | 2510 | 2803 | 3093 | 3360 |
| Tungsten | 2489 | 2766 | 3044 | 3307 |
| Vanadium | 2515 | 2786 | 3058 | 3317 |
| Nickel Aluminate | 1841 | 2120 | 2423 | 2740 |
| Silicon Carbide | 1742 | 2009 | 2303 | 2616 |
| Tantalum Carbide | 2263 | 2558 | 2864 | 3162 |
| Aluminum Nitride | 1803 | 2083 | 2387 | 2707 |
| Boron Nitride | 1848 | 2166 | 2519 | 2887 |
| Aluminum Oxide | 2254 | 2657 | 3048 | 3384 |
| Beryllium Oxide | 1893 | 2212 | 2577 | 2937 |
| Cerium Oxide | 2309 | 2650 | 2990 | 3301 |
| Chromium Oxide | 1760 | 2031 | 2329 | 2646 |
| Manganese Oxide | 1997 | 2306 | 2639 | 2975 |
| Neodymium Oxide | 2270 | 2646 | 3020 | 3351 |
| Nickel Oxide | 1834 | 2112 | 2413 | 2729 |
| Silicon Oxide | 1906 | 2254 | 2643 | 3041 |
| Thorium Oxide | 2436 | 2809 | 3159 | 3455 |
| Zinc Oxide | 1870 | 2206 | 2580 | 2967 |
| Zirconium Oxide | 2155 | 2519 | 2884 | 3222 |
| Mantle Fabric | 2897 | 3284 | 3571 | 3756 |
| Oxidized Inconel | 1857 | 2132 | 2429 | 2739 |
| $Al_2O_3$ with Mo Coating | 2413 | 2634 | 2870 | 3111 |
| Water Film "Fingerprint" | 2057 | 2406 | 2789 | 3169 |

Table 4. COUPLING EFFICIENCIES OF FLOW-THROUGH RADIATORS (Assuming Maximum Heat Transfer) WITH THIN FILM OF WATER AS ABSORBER

| Radiating Material | Velocity, SCF/hr-sq ft | | | |
|---|---|---|---|---|
| | 250 % | 500 % | 1000 % | 2000 % |
| Blackbody | 46.75 | 43.62 | 39.72 | 35.44 |
| Beryllium | 26.29 | 22.22 | 18.67 | 15.73 |
| Carbon | 41.96 | 37.84 | 33.42 | 29.15 |
| Chromium | 37.28 | 33.10 | 29.02 | 25.36 |
| Iron | 30.15 | 25.85 | 22.08 | 19.03 |
| Molybdenum | 24.34 | 20.27 | 16.89 | 14.25 |
| Nickel | 29.43 | 25.16 | 21.44 | 18.46 |
| Palladium | 26.45 | 22.58 | 19.30 | 16.71 |
| Platinum | 25.90 | 21.84 | 18.48 | 15.89 |
| Rhodium | 29.00 | 24.60 | 21.02 | 18.39 |
| Silicon | 44.70 | 41.20 | 37.14 | 32.93 |
| Tantalum | 31.38 | 26.94 | 23.02 | 19.85 |
| Tungsten | 27.02 | 22.81 | 19.20 | 16.33 |
| Vanadium | 25.15 | 20.94 | 17.46 | 14.75 |
| Nickel Aluminate | 45.85 | 42.37 | 38.26 | 33.95 |
| Silicon Carbide | 46.47 | 43.37 | 39.53 | 35.32 |

| Radiating Material | | | |
|---|---|---|---|
| Tantalum Carbide | 37.47 | 33.03 | 28.78 | 25.06 |
| Aluminum Nitride | 46.46 | 43.12 | 39.06 | 34.70 |
| Boron Nitride | 48.39 | 46.77 | 44.54 | 41.88 |
| Aluminum Oxide | 49.12 | 45.88 | 42.26 | 38.99 |
| Beryllium Oxide | 46.67 | 44.42 | 41.38 | 37.86 |
| Cerium Oxide | 42.00 | 38.02 | 33.97 | 30.33 |
| Chromium Oxide | 46.59 | 43.53 | 39.74 | 35.59 |
| Manganese Oxide | 43.82 | 40.88 | 37.48 | 33.97 |
| Neodymium Oxide | 44.86 | 42.40 | 39.62 | 36.91 |
| Nickel Oxide | 45.65 | 42.10 | 37.91 | 33.52 |
| Silicon Oxide | 49.30 | 49.00 | 48.52 | 47.83 |
| Thorium Oxide | 44.93 | 40.36 | 36.00 | 32.45 |
| Zinc Oxide | 49.07 | 47.97 | 46.42 | 44.54 |
| Zirconium Oxide | 47.36 | 43.22 | 38.71 | 34.53 |
| Mantle Fabric | 47.01 | 44.95 | 42.80 | 41.06 |
| Oxidized Inconel | 44.85 | 41.04 | 36.64 | 32.12 |
| $Al_2O_3$ with Mo Coating | 10.20 | 8.57 | 7.21 | 6.09 |
| Water Film "Fingerprint" | 59.87 | 59.62 | 59.09 | 58.48 |

Table 5. OVERALL EFFICIENCIES OF FLOW-THROUGH RADIATORS (Assuming Maximum Heat Transfer) WITH THIN FILM OF WATER AS ABSORBER

| Radiating Material | Velocity, SCF/hr-sq ft | | | |
|---|---|---|---|---|
| | 250 % | 500 % | 1000 % | 2000 % |
| Blackbody | 32.99 | 27.62 | 21.91 | 16.38 |
| Beryllium | 14.00 | 10.22 | 7.14 | 4.75 |
| Carbon | 26.80 | 21.27 | 15.97 | 11.32 |
| Chromium | 21.24 | 16.17 | 11.64 | 7.90 |
| Iron | 15.12 | 10.86 | 7.40 | 4.77 |
| Molybdenum | 11.59 | 8.07 | 5.36 | 3.39 |
| Nickel | 14.58 | 10.40 | 7.45 | 4.51 |
| Palladium | 12.40 | 8.74 | 5.84 | 3.68 |
| Platinum | 11.87 | 8.21 | 5.40 | 3.36 |
| Rhodium | 11.95 | 8.00 | 5.05 | 3.01 |
| Silicon | 29.86 | 24.39 | 18.86 | 13.69 |
| Tantalum | 15.31 | 10.83 | 7.24 | 4.57 |
| Tungsten | 13.33 | 9.42 | 6.33 | 4.04 |
| Vanadium | 12.22 | 8.53 | 5.68 | 3.60 |
| Nickel Aluminate | 30.97 | 25.36 | 19.61 | 14.28 |
| Silicon Carbide | 32.62 | 27.28 | 21.61 | 16.13 |
| Tantalum Carbide | 20.92 | 15.64 | 11.05 | 7.35 |
| Aluminum Nitride | 31.86 | 26.25 | 20.42 | 14.93 |
| Boron Nitride | 32.59 | 27.39 | 21.60 | 15.80 |
| Aluminum Oxide | 27.55 | 20.41 | 13.88 | 8.66 |
| Beryllium Oxide | 30.86 | 25.32 | 19.38 | 13.71 |
| Cerium Oxide | 22.89 | 16.99 | 11.76 | 7.57 |
| Chromium Oxide | 32.49 | 27.13 | 21.44 | 15.95 |
| Manganese Oxide | 27.73 | 22.32 | 16.88 | 11.91 |
| Neodymium Oxide | 24.94 | 19.01 | 13.35 | 8.60 |
| Nickel Oxide | 30.91 | 25.87 | 19.54 | 14.21 |
| Silicon Oxide | 32.42 | 27.48 | 21.78 | 15.81 |
| Thorium Oxide | 22.87 | 16.15 | 10.58 | 12.97 |
| Zinc Oxide | 32.76 | 27.55 | 21.69 | 15.73 |
| Zirconium Oxide | 27.88 | 20.96 | 14.62 | 9.48 |
| Mantle Fabric | 17.59 | 11.46 | 6.79 | 3.75 |
| Oxidized Inconel | 30.10 | 24.42 | 18.72 | 13.52 |
| $Al_2O_3$ with Mo Coating | 5.26 | 3.87 | 2.76 | 1.88 |
| Water Film "Fingerprint" | 36.90 | 30.85 | 24.00 | 17.02 |

Table 6. COUPLING EFFICIENCIES OF FLOW-THROUGH RADIATORS (Assuming Maximum Heat Transfer) WITH "SUBSTANCE 1" ABSORBER

| Radiating Material | Velocity, SCF/hr-sq ft | | | |
|---|---|---|---|---|
| | 250 % | 500 % | 1000 % | 2000 % |
| Blackbody | 93.80 | 88.60 | 81.72 | 73.81 |
| Beryllium | 57.68 | 49.54 | 42.15 | 35.85 |
| Carbon | 86.20 | 78.77 | 70.46 | 62.13 |
| Chromium | 78.06 | 70.13 | 62.11 | 54.75 |
| Iron | 63.83 | 55.28 | 47.60 | 41.28 |
| Molybdenum | 54.54 | 46.09 | 38.83 | 33.04 |
| Nickel | 62.57 | 53.95 | 46.30 | 40.09 |
| Palladium | 58.56 | 50.59 | 43.63 | 38.02 |
| Platinum | 57.14 | 48.79 | 41.68 | 36.11 |
| Rhodium | 60.59 | 51.80 | 44.54 | 39.14 |
| Silicon | 90.86 | 84.69 | 77.23 | 69.23 |
| Tantalum | 67.97 | 59.09 | 51.01 | 44.32 |
| Tungsten | 61.65 | 52.87 | 45.08 | 38.70 |
| Vanadium | 55.17 | 46.44 | 39.04 | 33.18 |
| Nickel Aluminate | 92.07 | 86.20 | 78.85 | 70.80 |
| Silicon Carbide | 93.65 | 88.46 | 81.62 | 73.79 |
| Tantalum Carbide | 79.30 | 71.12 | 62.89 | 55.41 |
| Aluminum Nitride | 93.19 | 87.65 | 80.45 | 72.34 |
| Boron Nitride | 97.06 | 94.26 | 90.21 | 85.26 |
| Aluminum Oxide | 94.51 | 89.36 | 83.14 | 77.23 |
| Beryllium Oxide | 96.12 | 92.13 | 86.32 | 79.35 |
| Cerium Oxide | 87.01 | 79.84 | 72.13 | 64.95 |
| Chromium Oxide | 93.85 | 88.80 | 82.12 | 74.43 |
| Manganese Oxide | 92.15 | 86.90 | 80.49 | 73.62 |
| Neodymium Oxide | 94.31 | 90.13 | 85.00 | 79.72 |
| Nickel Oxide | 91.89 | 85.85 | 78.29 | 70.03 |
| Silicon Oxide | 99.35 | 98.58 | 97.32 | 95.68 |
| Thorium Oxide | 87.41 | 79.61 | 71.78 | 65.28 |
| Zinc Oxide | 98.19 | 96.36 | 93.63 | 90.18 |
| Zirconium Oxide | 91.95 | 85.24 | 77.37 | 69.74 |
| Mantle Fabric | 94.00 | 89.00 | 85.58 | 82.10 |
| Oxidized Inconel | 90.59 | 83.96 | 75.89 | 67.27 |
| $Al_2O_3$ with Mo Coating | 27.70 | 23.26 | 19.47 | 16.36 |
| Water Film "Fingerprint" | 98.36 | 97.40 | 96.31 | 95.28 |

Table 7. COUPLING EFFICIENCIES OF FLOW-THROUGH RADIATORS (Assuming Maximum Heat Transfer) WITH "SUBSTANCE 2" ABSORBER

| Radiating Material | Velocity, SCF/hr-sq ft | | | |
|---|---|---|---|---|
| | 250 % | 500 % | 1000 % | 2000 % |
| Blackbody | 6.27 | 11.40 | 18.28 | 26.19 |
| Beryllium | 42.32 | 50.46 | 57.85 | 64.15 |
| Carbon | 13.80 | 21.23 | 29.54 | 37.89 |
| Chromium | 21.94 | 29.86 | 37.89 | 45.25 |
| Iron | 36.17 | 44.72 | 52.39 | 58.71 |
| Molybdenum | 45.46 | 53.91 | 61.17 | 66.97 |
| Nickel | 37.43 | 46.05 | 53.70 | 59.92 |
| Palladium | 41.44 | 49.41 | 56.37 | 61.97 |
| Platinum | 42.86 | 51.21 | 58.32 | 63.89 |
| Rhodium | 39.41 | 48.20 | 55.46 | 60.86 |
| Silicon | 9.20 | 15.31 | 22.77 | 30.77 |
| Tantalum | 32.03 | 40.91 | 48.99 | 55.68 |
| Tungsten | 38.35 | 47.13 | 54.92 | 61.30 |
| Vanadium | 44.83 | 53.56 | 60.96 | 66.82 |
| Nickel Aluminate | 7.93 | 13.80 | 21.15 | 29.20 |
| Silicon Carbide | 6.35 | 11.54 | 18.38 | 26.21 |
| Tantalum Carbide | 20.71 | 28.88 | 37.11 | 44.59 |
| Aluminum Nitride | 6.81 | 12.35 | 19.56 | 27.66 |
| Boron Nitride | 2.94 | 5.74 | 9.79 | 14.74 |
| Aluminum Oxide | 5.49 | 10.64 | 16.86 | 22.77 |
| Beryllium Oxide | 3.88 | 7.87 | 13.68 | 20.65 |
| Cerium Oxide | 12.99 | 20.16 | 27.87 | 35.05 |
| Chromium Oxide | 6.15 | 11.20 | 17.88 | 25.57 |
| Manganese Oxide | 7.85 | 13.10 | 19.51 | 26.38 |
| Neodymium Oxide | 5.69 | 9.87 | 15.00 | 20.28 |
| Nickel Oxide | 8.11 | 14.15 | 21.71 | 29.96 |
| Silicon Oxide | 0.65 | 1.42 | 2.68 | 4.32 |
| Thorium Oxide | 12.59 | 20.39 | 28.22 | 34.77 |
| Zinc Oxide | 1.81 | 3.64 | 6.37 | 9.82 |
| Zirconium Oxide | 8.05 | 14.76 | 22.63 | 30.26 |
| Mantle Fabric | 6.00 | 10.10 | 14.42 | 17.90 |
| Oxidized Inconel | 9.40 | 16.03 | 24.11 | 32.72 |
| $Al_2O_3$ with Mo Coating | 72.30 | 76.74 | 80.53 | 83.64 |
| Water Film "Fingerprint" | 1.64 | 2.60 | 3.69 | 4.72 |

In the above tables, the amount of heat input to the radiant heating device is expressed in terms of velocity of the fuel input. The velocities given in the tables represent the total of a methane and air mixture, present in a ratio of 1:10, respectively, supplied to the heater. Thus, a velocity of 250 SCF/hr-sq. ft. represents an input of about 23 standard cubic feet of methane, which is substantially pure methane, and 227 standard cubic feet of air per hour per square foot of radiating element surface area. The actual heat input is obtained by multiplying by 83.1 BTU/SCF.

From the above tables it can be seen that although a black body has the best rated efficiency, due to its high emissivity, it does not necessarily possess the best coupling efficiency, for a particular absorber, or the best overall efficiency. Referring to Table 4, it can be seen that the coupling efficiency of aluminum oxide, silicone oxide, zinc oxide and zirconium oxide all have better coupling efficiencies with a thin film of water as the abosrber than a black body radiator. More-over, as seen in Table 5, the high coupling efficiency of aluminum oxide in not sufficient to compensate for its relatively low rated efficiency, as indicated in Table 1, so that the overall efficiency of aluminum oxide radiator with respect to a thin film of water as an absorber is much lower than that for zinc oxide. In fact, the overall efficiency of zinc oxide as a radiator, with a thin film of water as an absorber, is almost as high as that for a theoretical black body.

Referring to Table 7, it is seen that the coupling efficiencies of almost all listed materials are very high, when used to heat a "substance 2" absorber, with the exception of aluminum oxide with molybdenum coating radiator. On the other hand, as indicated in Table 6, most of the listed materials have relatively low coupling efficiencies when used to heat a "substance 1" absorber. Thus, if a black body radiator is employed to heat a substance having an absorptivity of about 1.0 for radiating energy with a wavelength of 2 microns or above, but with an absorptivity of about 0 for radiant energy with wavelengths less than 2 microns, the overall efficiency would range from only slightly more than 4 to about 12 percent, for the inputs indicated. On the other hand, if an aluminum oxide with molybdenum coating radiator is employed for this same purpose, the overall efficiency would range from about 37 to 25 percent. This clearly demonstrates that a black body is not necessarily the best material for constructing the radiant element in a radiant heating device.

The above method for determining the overall efficiencies of various radiant heating elements when heating a particular absorber has been confirmed by experimental results.

In one experiment, the overall efficiency of an Inconel radiator was determined as follows. An endless strip of Mylar film, 0.003 to 0.005 inch thick, was horizontally mounted on two guide rollers. One of the rollers was driven by a motor to impart motion to the Mylar film. A thin film of water about 0.01 mm thick was deposited onto the Mylar by passing the same through a water reservoir having a squeegee therein. After picking up the film of water, the Mylar strip was passed under a horizontally mounted, overhead radiant burner to evaporate the water. This cycle was repeated for a given period of time, say an hour, and the amount of water evaporated determined. The burner was of the North American "flat flame" type burning a metered amount of a fuel mixture containing natural gas and air in a molar ratio of about 1:10. The radiating element in this burner was made of 12 layers of Inconel screen arranged in a manner to make the entire radiator opaque, i.e. 100 percent "solid." In this manner, there was a very high effective heat transfer coefficient between the hot flue gases and the radiator. When this radiant heat device was operated to evaporate the thin film of water on the Mylar strip, it was found that the overall efficiency was 19.2 percent at a total heat input of 72.000 BTU/hr-sq. ft. and it was 18 percent at 108.000 BTU/hr-sq. ft. These experimentally obtained overall efficiencies for an Inconel radiator agree well with the calculated values of 19.8 and 17.5 percent, respectively, interpolated from Table 1 above. Measurements made on a silica radiator corresponding to an input of 40,000 BTU/hr ft$^2$ give an overall efficiency of 27.3 percent which compares to an interpolated value of 27.8 percent.

The agreement between the experimentally obtained overall efficiencies and those calculated from available radiation data shows that the calculations method can be used to find the most effective materials for making the radiating element in a heater for heating a particular absorber. However, the present invention is not dependent on this agreement.

Thus far, the invention has been described with respect to a fuel burning radiant heater having a single radiating element therein. However, the method of the invention is also applicable to radiant heaters having a plurality of radiating elements, as seen, for example, in the Figures. Thus, it is possible to construct a radiant heater 1 having two parallel, in-line radiators to increase the overall efficiency of the radiant heater in heating the radiation absorbing work 2. One such embodiment of a radiant heating device having two radiating elements 3 and 4, may be made by providing two flat, parallel in-line radiators wherein the first radiator 3 is opaque for all practical purposes and the second radiator 4 is structured like a screen and has about 80 percent of its surface as open area. The opaque first radiator may be made by super-imposing a plurality of screens on each other so that no light can directly pass through them or by using a drilled hole burner block, 3, which is almost opaque if the hole depth is at least three times its diameter. When a fuel burning radiant device contains two such in-line radiators, a fuel-air mixture 5 may be passed through the first radiator and burned near its surface 6. The hot flue gases 7 from the first radiator are then passed to the second radiator 4 to heat the same, and the combustion products removed as at 8. Other intermediate screen-like radiators 9, 10, 11, etc., may also be employed.

Figure 2:
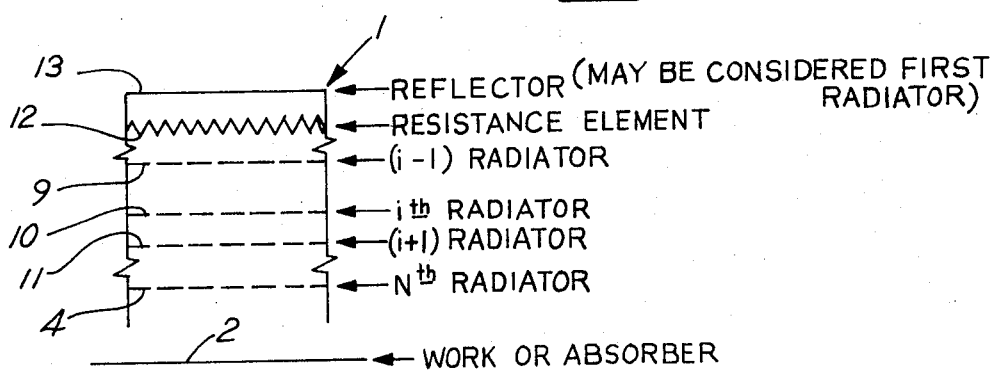
FIG. 2 shows schematically an electrically heated radiation emitting element in accord with another embodiment of the invention.

FIG. 2 shows a plural radiators embodiment in which the first radiator is a reflective surface 13 heated by radiation from electrical resistance element 12, in place of the burner block assembly 3 in FIG. 1. This first element is a radiator since there is no gas flow to recover the energy radiated in the direction away from the work. No combustion products removal is required in this embodiment.

Table 8 indicates the calculated results of using a reradiator with 20 percent solid area. Several of the single radiator results are shown there for comparison purposes. It is observed that oxidized Inconel is the poorest of the single radiators included in the table. The overall behavior of Inconel is very similar to the experimental data we have obtained on commercially available burners. These burners usually are rated at an input of 400 SCFH (approximately 40,000 BTU/hr).

TABLE 8

[Efficiencies of burners with reradiating screens heating a thin film of water 0.01 mm. thick]

| Principal radiator | Reradiator (20% solid area) | Input flow rate of stoichiometric methane and air | | | | | | | | | | | |
|---|---|---|---|---|---|---|---|---|---|---|---|---|---|
| | | 250 s.c.f.h./ft.$^2$ | | | 500 s.c.f.h./ft.$^2$ | | | 1000 s.c.f.h./ft.$^2$ | | | 2000 s.c.f.h./ft.$^2$ | | |
| | | CE* | RE* | OE* | CE* | RE* | OE* | CE* | RE* | OE* | CE* | RE* | OE* |
| SiO$_2$ | Cr$_2$O$_3$ | 48.81 | 72.41 | 35.34 | 47.50 | 64.12 | 30.46 | 45.31 | 54.20 | 24.56 | 42.22 | 43.01 | 18.16 |
| SiO$_2$ | BN | | | | | | | | | | 45.66 | 39.57 | 18.07 |
| SiO$_2$ | ZnO | 49.33 | 71.25 | 35.15 | 48.75 | 61.93 | 30.18 | 47.72 | 50.58 | 24.14 | 46.33 | 37.94 | 17.58 |
| SiO$_2$ | SiO$_2$ | 49.39 | 70.64 | 34.89 | 49.00 | 61.11 | 29.94 | 48.29 | 49.52 | 23.91 | 47.35 | 36.70 | 17.38 |
| SiO$_2$ | Oxidized Inconel | 48.68 | 71.44 | 34.78 | 47.27 | 62.95 | 29.76 | 44.94 | 52.91 | 23.78 | 41.68 | 41.69 | 17.38 |
| Oxidized Inconel | do | 44.66 | 72.00 | 32.15 | 40.82 | 64.41 | 26.29 | 36.40 | 55.74 | 20.29 | 31.88 | 46.21 | 14.73 |

TABLE 8—Continued
[Efficiencies of burners with reradiating screens heating a thin film of water 0.01 mm. thick]

| Principal radiator | Reradiator (20% solid area) | Input flow rate of stoichiometric methane and air | | | | | | | | | | |
|---|---|---|---|---|---|---|---|---|---|---|---|---|
| | | 250 s.c.f.h./ft.² | | | 500 s.c.f.h./ft.² | | | 1000 s.c.f.h./ft.² | | | 2000 s.c.f.h./ft.² | | |
| | | CE* | RE* | OE* | CE* | RE* | OE* | CE* | RE* | OE* | CE* | RE* | OE* |
| Cr₂O₃ | Cr₂O₃ | 46.34 | 73.60 | 34.11 | 43.12 | 66.41 | 28.64 | 39.18 | 57.98 | 22.72 | 34.91 | 48.54 | 16.94 |
| Oxidized Inconel | | 44.85 | 67.11 | 30.10 | 41.04 | 59.51 | 24.42 | 36.64 | 51.08 | 18.72 | 32.12 | 42.09 | 13.52 |
| SiO₂ | | 49.30 | 65.76 | 32.42 | 49.00 | 56.07 | 27.48 | 48.52 | 44.89 | 21.78 | 47.83 | 33.06 | 15.81 |
| Cr₂O₃ | | 46.59 | 69.74 | 32.49 | 43.53 | 62.35 | 27.13 | 39.74 | 53.95 | 21.44 | 35.59 | 44.81 | 15.95 |
| BN | | 48.39 | 67.34 | 32.59 | 46.77 | 58.56 | 27.39 | 44.54 | 48.50 | 21.60 | 41.88 | 37.71 | 15.80 |
| ZnO | | 49.07 | 66.76 | 32.76 | 47.97 | 57.44 | 27.55 | 46.42 | 46.72 | 21.69 | 44.54 | 35.32 | 15.73 |

*CE = Coupling efficiency, RE = Rated efficiency, OE = Overall efficiency.
NOTE.—The heat transfer coefficient between the gas and all the radiators is assumed to be large.

The other four materials yield overall efficiencies for single radiators which are extremely close to each other and considerably better than oxidized Inconel. It is observed that the overall efficiencies of each of these single materials are better than the efficiency of the Inconel-Inconel reradiator system. This Inconel-Inconel system may be considered representative of commercially available burners. (The primary radiator is usually made of clay, not Inconel, but the radiation properties of the clay are relatively close to those of Inconel.) Experimental values of present day burners match those of the computed value of Inconel.

One might assume that the best performance would be obtained by combining silica with silica since it is a very good single radiator. However, the best performance is obtained with a combination of silica and chromium oxide. The performance of this pair is better than either $SiO_2 - SiO_2$ or $Cr_2O_3 - Cr_2O_3$. As individual radiators, silica exhibits the largest coupling efficiency while chromium oxide exhibits the lowest (except Inconel) even though the overall efficiencies are approximately the same. This leads us to conclude that silica has a poor coupling efficiency with chromium oxide and that this fact is responsible for the superior operation of the $SiO_2 - Cr_2O_3$ combination. It thus appears that the best arrangement for a reradiator system is one having its two elements made of different materials each having a high overall efficiency and coupling efficiencies which are as different as possible. However, if the two coupling efficiencies are the same (for example, the same material), the overall efficiency obtained will be higher than using another material with the same rated efficiency but having poorer coupling efficiency.

All the above results are presented for the instance when the percent solid area of the second radiator is 20 percent. Calculations have also been made on 50 and 80 percent for some of these combinations. A slight increase over the 20 percent solid area result is usually noted for the 50 percent solid area and a slight decrease for the 80 percent solid area. Thus, the same results will be obtained for different values of this parameter.

There are many applications of the principles of our invention where it is advantageous to use a material that is a poor coupler. For example, furnace walls may be a poor coupler and in this case heat losses would be reduced since less heat transfers thereto.

In addition, coupling contrast is an important feature of this invention. By this is meant the use of two or more materials having coupling differences that provide for selective heat transfer. An example is printing ink onto paper. Poor coupling between the burner and paper, while the ink has good coupling, causes faster ink drying and at the same time prevents paper scorching.

The invention has been described in detail with particular reference to preferred embodiments thereof, but it will be understood that variations and modifications can be effected within the spirit and scope of the invention as described hereinabove and as defined in the appended claims.

We claim:

1. A method for making a high efficiency radiant heating device having a plurality of radiation emitting elements therein for heating an absorber of radiant energy comprising the steps of:
   a. determining the particular wave lengths in which said absorber absorbs radiant energy,
   b. determining the wave lengths of materials which upon heating emit radiant energy,
   c. selecting from said materials at least one material having high emissivity at wave lengths substantially corresponding to said particular wave lengths of said absorber.
   d. forming said radiation emitting elements from said selected material, and
   e. assembling said elements in association with a means for supplying heat to said element in a parallel in-line relationship, each of said elements being made from a material selected from said materials and having a high emissivity.

2. A method according to claim 1 wherein said heat supplying means is of the electric resistance type.

3. A method according to claim 1 wherein said radiant heating device is of the fuel-burning type and at least one of said radiation emitting elements is a foraminous, screen-like structure having about 70-85 percent of its surface area open for the passage of flue gases.

4. A method according to claim 3 wherein said radiation emitting element has about 80 percent of its surface area open.

5. A method according to claim 1 wherein said heat supplying means is of the fuel-burning type.

6. A method according to claim 5 wherein said materials selection step includes selecting materials having different coupling efficiencies, and having high overall efficiencies with respect to said absorber.

7. In a radiant heating device having at least one radiation emitting element therein which upon heating emits radiant energy for transfer to an absorber of radiant energy, the improvement wherein said heating device includes two parallel in-line radiation emitting elements, each of said elements being made from a material which has a high emissivity and which emits radiant energy upon being heated which has wave lengths substantially corresponding to the particular wave lengths at which said absorber absorbs radiant energy.

8. The device according to claim 7 wherein said element is heated by electric resistance means.

9. The radiant heating device according to claim 7 wherein said elements are heated by burning fuel and at least one of said elements is a foraminous, screen-like structure having about 20–85 percent of its surface area open for the passage of flue gases.

10. The radiant heating device according to claim 9 wherein said structure has about 70–85 percent of its surface area open.

11. The radiant heating device according to claim 7 wherein said elements are made from the same material.

12. A method for heating an absorber of radiant energy having particular wave lengths comprising providing a radiant heating device having two parallel in-line radiation emitting elements therein, each of said elements being made from a material which has a high emissivity and which emits radiant energy upon being heated at wave lengths closely corresponding to said particular wave lengths, and supplying heat to said elements to generate radiant energy for absorption by said absorber.

13. A method according to claim 12 wherein said heat is supplied in the form of electrical energy.

14. A method according to claim 12 wherein said heat is supplied by the burning of fuel.

15. A method according to claim 12 wherein said elements are made from the same material.

* * * * *